Oct. 30, 1945.                K. E. RIPPER                2,388,184
                  HIGH STRENGTH LAMINATED AMINO PLASTICS
                         Filed Aug. 17, 1940

INVENTOR
KURT E. RIPPER,
BY James Edwin Archer
ATTORNEY.

Patented Oct. 30, 1945

2,388,184

UNITED STATES PATENT OFFICE 2,388,184

HIGH STRENGTH LAMINATED AMINO PLASTICS

Kurt E. Ripper, Bronxville, N. Y., assignor to American Cyanamid Company, New York, N. Y., a corporation of Maine Application August 17, 1940, Serial No. 353,150

5 Claims. (Cl. 154—43)

This invention relates to laminated materials bonded with synthetic resins and more particularly to increasing the strength of such materials.

Previously various laminated materials have been made by the impregnation of sheets of paper or layers of fabric with a synthetic resin and subsequently stacking these impregnated sheets and molding them under heat and pressure to form a consolidated article. The mechanical strength of many synthetic resins such as the phenol-formaldehyde resins, for example, is substantially greater when the resins are reinforced with paper or fabric laminae than when the resin is merely mixed with a fibrous filler such as cellulose pulp. On the other hand amino plastic resins do not show appreciably greater mechanical strength when they are reinforced with paper or fabric laminae than when they are merely mixed with cellulosic fibers not in the form of paper of fabric. In other words the reinforcing effect of the cellulosic filler in fabricated form (paper or cloth) is practically lost when it is associated with amino plastics. The problem of producing amino plastic materials of especially high mechanical strength has been a problem of long standing.

An object of this invention is to provide amino plastic resins of high mechanical strength.

A more particular object of this invention is to increase the mechanical strength of amino plastic bonded laminated materials.

These and other objects are attained by forming an assembly including a plurality of layers of textile fabric or paper and one or more layers of glass cloth and bonding the assembly together with an amino plastic resin.

Figure 1 of the drawing is a perspective of a laminated material, alternate layers of which are glass cloth and paper, the laminae being separated at one corner for purposes of illustration.

The following examples in which the proportions are in parts by weight are given by way of illustration and not in limitation.

Example 1

Sheets of paper and sheets of glass cloth (0.01 inch thick) are impregnated with a melamine-modified dicyandiamide-formaldehyde resin syrup (Resin "A"). The impregnated paper and glass cloth are dried and partially polymerized by placing in an oven at a temperature of about 70° C. for about fifteen to thirty minutes. The glass cloth is preferably placed horizontally because of the tendency of the resin syrup to run off of the sheet in a vertical position. The impregnated paper contains about 55% of resin solids before pressing while the glass cloth contains about 27%–30% of resin solids before pressing.

Figure 1:
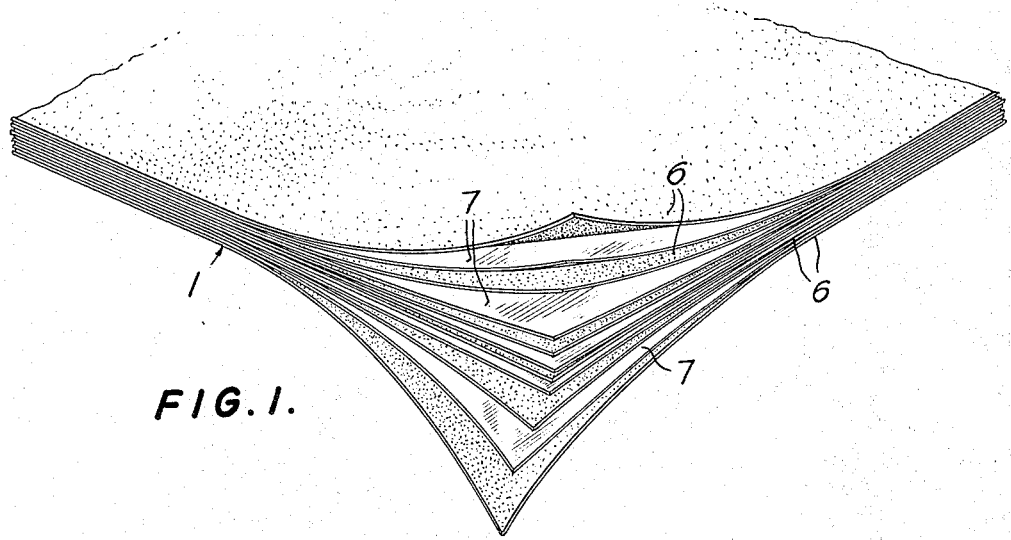

A laminated plate which comprises six sheets of the impregnated paper 6, which are stacked with alternate layers (5 sheets) of the impregnated glass cloth 7, as illustrated in Figure 1. The assembly of paper and cloth is placed between hot platens at a temperature of 140°–145° C. and subjected to a pressure of about 2000 pounds per square inch for about thirty minutes. The resulting laminated plate I is very homogeneous and contains about 30% of resin solids. The impact strength is about 262 cm. kg./cm.$^2$ while the bending strength is about 2,194 kg./cm.$^2$.

The values obtained with the laminations containing glass cloth and paper arranged alternately show extremely high mechanical strength values as compared to paper alone. The impact strength of similar paper base laminated materials impregnated with the same resin and using the same general procedure as outlined above is about 10–11 cm. kg./cm.$^2$ and the bending strength in kg./cm.$^2$ is only about 1108. Thus the impact strength is increased around twenty-five times whereas the bending strength is approximately doubled by the use of the glass cloth.

Example 2

Figure 2:
Figure 2 illustrates a section of the laminated material which forms one embodiment of my invention.

Paper sheets and glass cloth are impregnated as described in Example 1 and an assembly is made of six of the former to three of the latter. The paper sheets 6 and the glass cloth 7 are stacked together to form the assembly 2 illustrated in Figure 2. This assembly is molded at about 140°–145° C. and under about 2000 pounds per square inch pressure for about one half hour. The resulting homogeneous laminated plate contains about 39% of resin solids and shows an impact strength of approximately 266 cm. kg./cm.$^2$ and a bending strength of about 1950 kg./cm.²

Example 3

Figure 3:
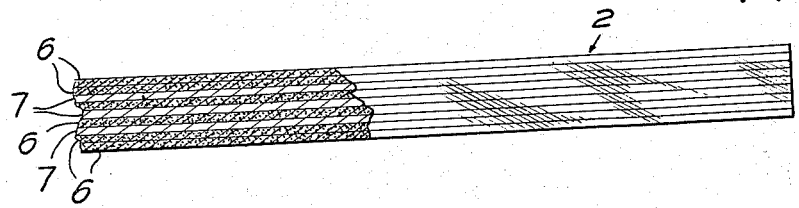
Figure 3 illustrates a section of a laminated material forming another embodiment of my invention.

Paper sheets and glass cloth are impregnated in the same manner as set forth in Example 1 and an assembly of six paper sheets and two glass cloth sheets is made of six of the former to two of the latter. Figure 3 shows the manner of arranging the sheets of paper 6, and the glass cloth 7 forming the assembly 3. This assembly is molded in the same manner as in the previous examples and a laminated plate containing about 35% of resin solids is obtained. This plate shows good homogenization and has an impact strength of 250 cm. kg./cm.² and a bending strength of about 1880 kg./cm.²

Example 4

An assembly made according to Example 3 containing the same synthetic resin is molded at about 1200 pounds per square inch pressure between hot platens at a temperature of 140°–145° C. for about one half hour. The impact strength of the product is 250 cm. kg./cm.², or in other words about the same strength as the product of Example 3.

Example 5

Figure 4:
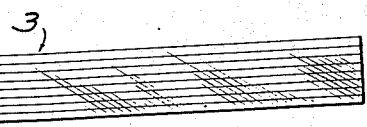
Figure 4 illustrates a section of a laminated material forming still another embodiment of my invention.

Paper sheets and glass cloth are impregnated in the same manner as set forth in Example 1 and an assembly 4 of six paper sheets 6 and one glass cloth sheet 7 is made up in the manner as illustrated in Figure 4. This assembly is molded at a pressure of about 1200 pounds per square inch under hot platens at 140–145° C. for about thirty minutes. A homogeneous laminated plate is obtained which has an impact strength of about 194 cm. kg./cm.² and a bending strength of 1485 kg./cm.².

An examination of the results of Examples 1–5 inclusive shows that decreasing the number of glass cloth sheets does not make a very great difference in the mechanical strength of the assembly. On the other hand, the presence of only one or two sheets of glass cloth increases the strength of the laminated material enormously as compared to materials not containing the glass cloth.

Example 6

Example 4 is repeated substituting a mixed melamine-urea-formaldehyde resin (Resin "B"). The product obtained is a homogeneous laminated plate having an impact strength of about 180 cm. kg./cm.³ as compared to an impact strength of about 21 cm. kg./cm.² for a material bonded with the same resin but not having glass cloth incorporated therein.

Example 7

Example 4 is repeated substituting urea-thiourea-formaldehyde resin (Resin "C") for the melamine modified dicyandiamide-formaldehyde resin. A laminated product is obtained which is quite homogeneous and which has an impact strength of about 184 cm. kg./cm.². A laminated product made with the same resin but without the glass cloth has an impact strength of about 30 cm. kg./cm.². Generally urea-thiourea-formaldehyde laminated paper materials have an impact strength of only about 11–13 cm. kg./cm.².

Resin "A" may be prepared by reacting dicyandiamide and a minor proportion of melamine with an aldehyde such as formaldehyde to produce a clear syrup as described in my copending applications Serial Nos. 311,935, 328,741 and 331,161. Resin "A" may also be prepared as described in my copending application Serial No. 351,915. The values of mechanical strength set forth in Examples 1 to 5 inclusive pertain to melamine modified dicyandiamide-formaldehyde resins prepared in accordance with the last mentioned copending application. Briefly the process involved comprises preparing a dicyandiamide-formaldehyde resin modified with a melamine formaldehyde hydrophilic sol obtained by refluxing a slightly acid mixture containing melamine and formaldehyde in the ratio of more than six mols of formaldehyde per mol of melamine.

Resin "B" may be prepared by any convenient method for the preparation of mixed urea-melamine-formaldehyde resins. The particular resin used in Example 6 may be prepared by the following procedure: 240 parts of formalin (an aqueous solution containing 37% formaldehyde by weight) is adjusted to pH of 6.42 (glass electrode). In the formalin 63 parts of melamine are dissolved thereby producing a solution having a pH of 6.70. This solution is reacted at 65° C. for about one hour. 68 parts of urea are added and the reaction is continued at about 65° C. for an additional period of about seventy-five minutes. A clear, stable syrup is obtained which does not precipitate after storing for relatively long periods.

Resin "C" may be prepared by any convenient method for the preparation of urea-thiourea-formaldehyde resin syrups. The resin used in Example 7 may be prepared by refluxing about 240 parts of formalin (an aqueous solution containing 37% by weight of formaldehyde) at a pH of 6.30 (glass electrode). The pH is then raised to 9.32 by adding about 10 parts of 10% solution of triethylamine. 60 parts of urea are added and the mixture is reacted at about 40° C. for an additional hour and this is followed by the addition of about 10 parts of 10% solution of salicyclic acid to adjust the pH at about 7.0 and also to provide a latent polymerization catalyst which will develop acidity sufficient to complete the reaction and/or polymerization during the drying and hardening of the resin.

Other amino plastic resins as well as various mixtures of any of these resins may be employed in place of those used in the above examples and such mixtures may be produced by mixing the separate resins or by mixing aldehyde-reactive materials before or during condensation with an aldehyde. Aminotriazine-aldehyde resins such as melamine-formaldehyde resins are especially suited for the purposes of my invention as well as urea-aldehyde condensation products, thiourea-aldehyde resins, dicyandiamide-formaldehyde resins, etc. Any appropriate curing catalyst may be added to the resins.

Figure 5:
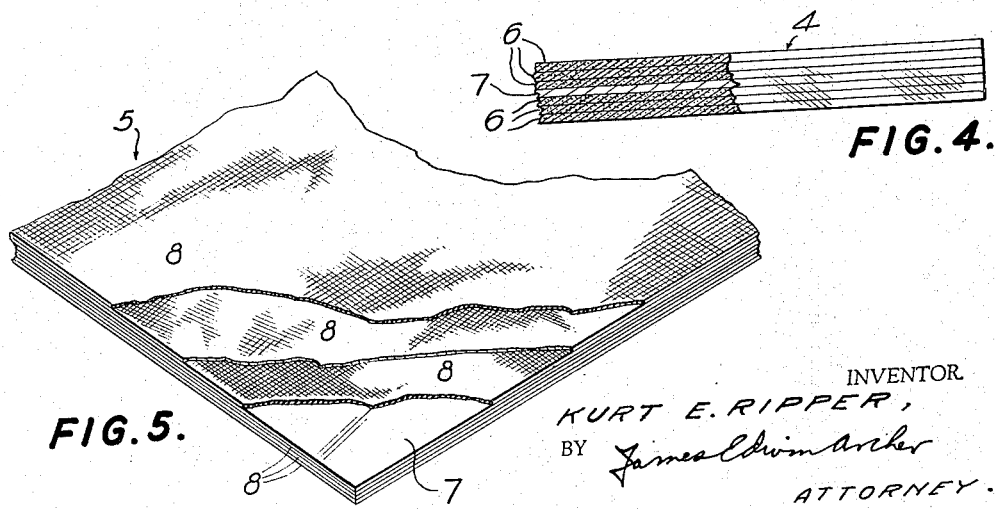
Figure 5 is a perspective of a further embodiment of my invention, part of the laminae being cut away at one corner for purposes of illustration.

My invention utilizing glass cloth as a reinforcing medium is applicable in amino plastic bonded laminations containing all types of fibrous sheet materials. The invention is, however, especially useful in laminations containing cellulosic sheet materials in the form of cloth, paper, felt, etc. Canvas cloth, linen cloth, etc. may be substituted for the paper used in the above examples. Furthermore various combinations of paper and cloth or combinations of various kinds of cloth may be used in place of the paper in the above examples. This modification of my invention is illustrated in Figure 5 where the assembly 5 is composed of layers of canvas cloth 8 and a layer of glass cloth 7. The glass cloth and canvas may also be arranged as illustrated in Figures 1–4 inclusive with the expectation that the canvas cloth is substituted for the paper.

Glass cloth having various thicknesses may be substituted for that used in the above examples. Glass cloth is commercially available in thicknesses ranging from about 0.002 inch to 0.015 inch, but the use of glass cloth of other dimensions is also within the scope of this invention. It has generally been found that glass cloth having a thickness of around 0.01 inch is well suited for the purposes of this invention since material thinner than this does not form quite as good a bond whereas material thicker than this is not so economical and the use thereof usually has little advantage over the use of the 0.01 inch thick cloth.

In some instances I have found that it is convenient to impregnate the glass cloth with a resin different from the impregnating resin used for the paper or fabric cloth with which the glass cloth is associated. For example, the glass cloth may be bonded with a dicyandiamide-formaldehyde resin, preferably modified with a minor proportion of melamine and the paper or other fabric to be used in the lamination is impregnated with a melamine-formaldehyde resin, a urea-formaldehyde resin, etc.

The term "glass cloth" as used herein is intended to cover not only woven, knitted, felted and braided types of materials but also thin foraminous sheets of glass. The term "glass" is intended to cover all types of glass including the so-called silica glass.

The procedure illustrated for the production of laminated plates is also adaptable for laminating materials in other forms, e. g. tubes, rods, etc. as well as for shaping in a mold.

Obviously many modifications may be made in the compositions and processes described without departing from the spirit and scope of the invention as described in the appended claims.

I claim:

1. A relatively rigid laminated article which has been consolidated by heat and pressure comprising an assembly including a plurality of layers of cellulosic fibrous material and embedded therein at least one layer of glass cloth, between at least two sheets of said fibrous material, the assembly being bonded with a synthetic, thermosetting amino plastic resin.

2. A relatively rigid laminated article which has been consolidated by heat and pressure comprising an assembly including a plurality of layers of cellulosic fibrous material and embedded therein at least one layer of glass cloth between at least two sheets of said fibrous material, the assembly being bonded with dicyandiamide-formaldehyde resin.

3. A relatively rigid laminated article which has been consolidated by heat and pressure comprising an assembly including a plurality of layers of cellulosic fibrous material and embedded therein at least one layer of glass cloth between at least two sheets of said fibrous material, the assembly being bonded with dicyandiamide-formaldehyde resin modified with a minor proportion of melamine.

4. A relatively rigid laminated article which has been consolidated by heat and pressure comprising an assembly including a plurality of layers of cellulosic fibrous material and embedded therein at least one layer of glass cloth between at least two sheets of said fibrous material, the assembly being bonded with melamine-formaldehyde resin.

5. A relatively rigid laminated article which has been consolidated by heat and pressure comprising an assembly including a plurality of layers of cellulosic fibrous material and embedded therein at least one layer of glass cloth between at least two sheets of said fibrous material, the assembly being bonded with a urea-formaldehyde resin.

KURT E. RIPPER.